(12) United States Patent
Johnston et al.

(10) Patent No.: US 9,167,333 B2
(45) Date of Patent: Oct. 20, 2015

(54) HEADSET DICTATION MODE

(71) Applicant: Plantronics, Inc.

(72) Inventors: Timothy P Johnston, Los Gatos, CA (US); William J Loewenthal, Jr., San Mateo, CA (US); Shantanu Sarkar, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 14/081,973

(22) Filed: Nov. 15, 2013

(65) Prior Publication Data

US 2015/0110263 A1 Apr. 23, 2015

Related U.S. Application Data

(63) Continuation-in-part of application No. 14/057,854, filed on Oct. 18, 2013.

(51) Int. Cl.
*H04M 1/00* (2006.01)
*H04M 9/00* (2006.01)
*H04R 1/10* (2006.01)
*G10L 15/26* (2006.01)
*H04M 1/60* (2006.01)
*H04R 27/00* (2006.01)

(52) U.S. Cl.
CPC .............. *H04R 1/1041* (2013.01); *G10L 15/26* (2013.01); *H04M 1/6058* (2013.01); *H04R 27/00* (2013.01); *H04R 2227/003* (2013.01); *H04R 2420/07* (2013.01)

(58) Field of Classification Search
CPC ........ H04R 1/10; H04M 1/6033; G10L 15/26
USPC ........... 381/74, 370; 455/575.2, 569.1, 569.2; 379/430
See application file for complete search history.

(56) References Cited

U.S. PATENT DOCUMENTS 7,885,419 B2 * 2/2011 Wahl et al. ...................... 381/74
2009/0318198 A1 * 12/2009 Carroll ........................ 455/569.1

OTHER PUBLICATIONS

Unknown, "BluePack™ Wireless Interview Tool User Guide," JK Audio, 20 pages, Jul. 3, 2013.

* cited by examiner

*Primary Examiner* — Tuan D Nguyen
(74) *Attorney, Agent, or Firm* — Chuang Intellectual Property Law

(57) ABSTRACT

Methods and apparatuses for headsets are disclosed. In one example, a headset includes a processor, a communications interface, a user interface, and a speaker. The headset includes a microphone array including two or more microphones arranged to detect sound and output two or more microphone output signals. The headset further includes a memory storing an application executable by the processor configured to operate the headset in a first mode utilizing a first set of signal processing parameters to process the two or more microphone output signals and operate the headset in a second mode utilizing a second set of signal processing parameters to process the two or more microphone output signals.

20 Claims, 14 Drawing Sheets

US 9,167,333 B2

HEADSET DICTATION MODE

CROSS REFERENCE TO RELATED APPLICATIONS

The present application is a continuation-in-part application of U.S. patent application Ser. No. 14/057,854 for "Headset Interview Mode," filed on Oct. 18, 2013, the entire disclosure of which is incorporated herein by reference for all purposes.

BACKGROUND OF THE INVENTION

Telephony headsets are optimized to detect the headset wearer's voice during operation. The headset includes a microphone to detect sound, where the detected sound includes the headset wearer's voice as well as ambient sound in the vicinity of the headset. The ambient sound may include, for example, various noise sources in the headset vicinity, including other voices. The ambient sound may also include output from the headset speaker itself which is detected by the headset microphone. In order to provide a pleasant listening experience to a far end call participant in conversation with the headset wearer, prior to transmission the headset processes the headset microphone output signal to reduce undesirable ambient sound detected by the headset microphone.

However, the inventors have recognized that this typical processing is undesirable in certain situations and limits the use of the headset. As a result, there is a need for improved methods and apparatuses for headsets.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
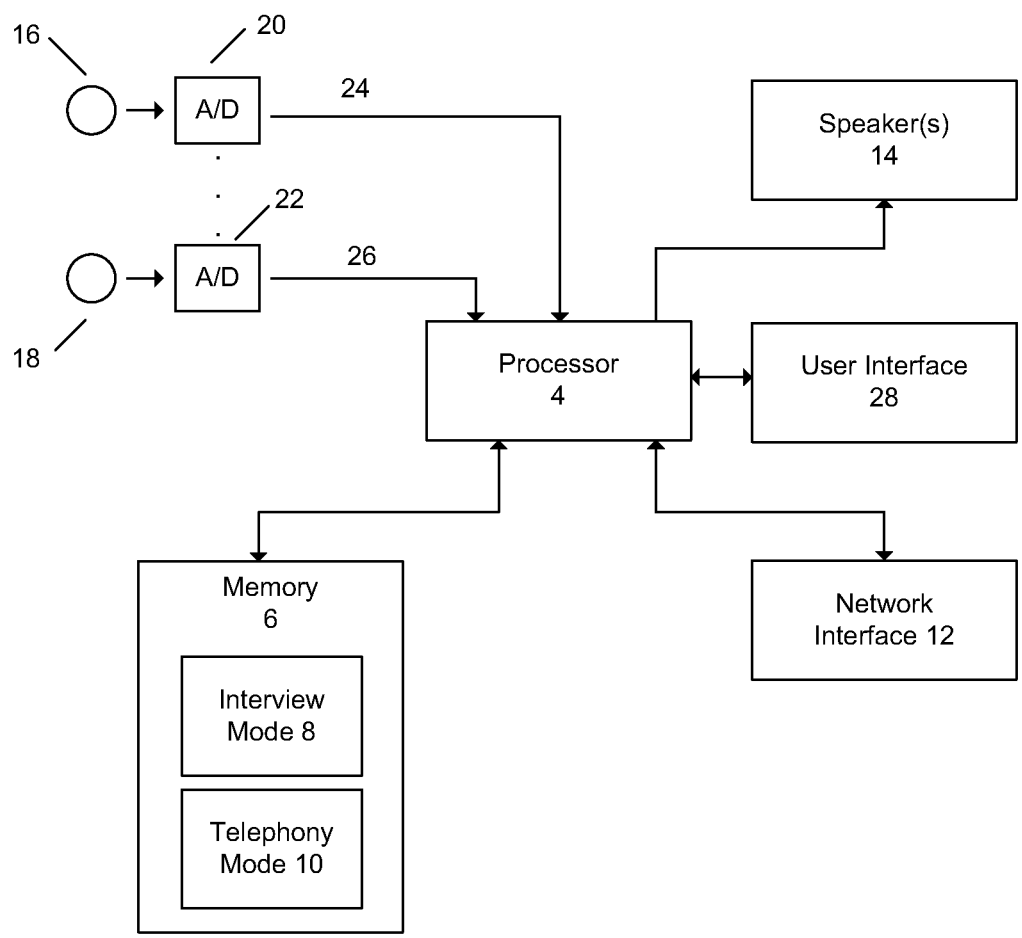
FIG. 1 illustrates a simplified block diagram of a headset in one example configured to implement one or more of the examples described herein.

Methods and apparatuses for headsets are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, the inventors have recognized that during interviews, medical procedures or other communications where a person is facing another person, object or device that can transmit sound or voice it can be useful to have both parties voices/sounds recorded for review, legal or medical record, learning or reference but also reduce background voices or sounds so the recording or transmission is clear. As used herein, the term "interview mode" refers to operation in any situation whereby a headset wearer is in conversation with a person across from them (e.g., a face-to-face conversation) in addition to a particular situation where the headset wearer is "interviewing" the person across from them. Furthermore, the terms "interviewee", "conversation participant", and "far-field talker" are used synonymously to refer to any such person in conversation with the headset wearer.

In one example, a headset includes a processor, a communications interface, a user interface, and a speaker arranged to output audible sound to a headset wearer ear. The headset includes a microphone array including two or more microphones arranged to detect sound and output two or more microphone output signals. The headset further includes a memory storing an interview mode application executable by the processor configured to operate the headset in an interview mode utilizing a set of signal processing parameters to process the two or more microphone output signals to optimize and transmit or record far-field speech.

In one example, a headset includes a processor, a communications interface, a user interface, and a speaker arranged to output audible sound to a headset wearer ear. The headset includes a microphone array including two or more microphones arranged to detect sound and output two or more microphone output signals. The headset further includes a memory storing an application executable by the processor configured to operate the headset in a first mode utilizing a first set of signal processing parameters to process the two or more microphone output signals and operate the headset in a second mode utilizing a second set of signal processing parameters to process the two or more microphone output signals.

In one example, a method includes operating a headset in a first mode or a second mode, the headset including a microphone array arranged to detect sound, and receiving sound at the microphone array and converting the sound to an audio signal. The method further includes eliminating a voice in proximity to a headset wearer in the audio signal in the first mode, and detecting and recording the voice in proximity to the headset wearer in the audio signal in the second mode.

In one example, one or more non-transitory computer-readable storage media have computer-executable instructions stored thereon which, when executed by one or more computers, cause the one more computers to perform operations including operating a headset in a first mode or a second mode, the headset including a microphone array arranged to detect sound. The operations include receiving sound at the microphone array and converting the sound to an audio signal, detecting a headset wearer voice and eliminating a voice in proximity to a headset wearer in the audio signal in the first mode, and detecting and recording the headset wearer voice and the voice in proximity to the headset wearer in the audio signal in the second mode.

In one example, a headset is operable in an "interview mode". The headset uses two or more microphones and a DSP algorithm to create a directional microphone array so that the voice of the person wearing a headset or audio device is partially isolated by using both the phase differences and timing differences that occur when sound or speech hits the geometrically arranged multi-microphone array. This approach is understood by those skilled in the art and has been described by but not limited to processes such as beam forming, null steering or blind source separation. The microphone array is retuned so that it is optimized for sensitivity to pick up a far field talker (i.e., a person talking to the headset wearer face-to-face) with given timing and phase determining the directional pattern at various frequencies for a given microphone alignment. If the wearer of the headset or other audio device then faces towards the person or object that they would like to interview or perform a procedure on, the headset transmits or records the voice or sounds of the person wearing the headset or audio device and the person or object across from them, but reduce the background sounds that are adjacent (e.g., to one side or behind the two talkers) or more distant.

In order to enhance the performance and audio clarity, a DSP algorithm utilizing the multi-microphone array can but is not limited to using the sound level/energy as well as a combination of phase information, spectral statistics, audio levels, peak to average ratio and slope detection to optimize a VAD (Voice Activity Detector). This VAD is optimized and would adapt for both the far field talker and sounds of the person wearing the headset or audio device. A spectral subtractor noise filter is then additionally used to reduce stationary ambient noise.

In one embodiment, the audio processing is tied to a camera that besides being able to record video, utilizes a remote sensor (such as an infra-red laser or ultrasonic sensor) reflector or algorithm to help further tune and optimize the multi-microphone directional characteristics and VAD thresholds or settings. This "FARVAD" is optimized based on distance and direction. The detected distance and direction is utilized in combination with an adjustment of the VAD threshold to set speech to "active" when a far-talker is speaking. This allows more noise in, but does not eliminate low energy portions of the far-talker's voice.

In one example, during the interview mode (also referred to herein as a far-talker recording mode or face-to-face conversation mode), when activated by some means (e.g., user interface button, voice activation, or gesture recognition at a user interface) begins the use of a highly directional microphone array approach of three or more microphones in an end-fire array approach with a VAD tuning adjusted to pick up the far talker "FARVAD". The speech level detection is tuned with about 30 dB more sensitivity than the near talker (i.e., the headset wearer), but also tuned to react only to the microphone array conditioned audio. When the FARVAD is retuned, the overall noise reduction system reacts to the room noise level and so that low energy speech from the far talker is not removed.

During the recording/transmission process, the audio processing utilizes a multi-band compressor/expander that normalizes the audio levels of both near and far talkers. This audio transmission is stored on the device. In a further example, it is transmitted and stored on the cloud (e.g., on a server coupled to the Internet) for later access. In one example, video is transmitted together with the corresponding audio.

Usage applications of the methods and apparatuses described herein include, but are not limited to interviews, medical procedures, or actions where sound/voice of both the person wearing the device and person opposite can be recorded or transmitted. However, background level noise and other nearby voices are still reduced. The usage applications include scenarios where a person is wearing a headset or audio device with one or more microphones and would like to capture both their voice and the voice or sound of another person or device across from them and also reduce background noise. Advantageously, in certain examples the methods and apparatuses described create value by clearly recording or transmitting both the voice and sounds of the person wearing the headset or audio device and another person's voice opposite to them, while reducing background sounds and voices (e.g., by up to 6 dB relative to the intended far talker pickup) that could make the transmission or recording unclear.

In one example, a headset is operable in several modes. In one mode, the headset is configured to operate in a far-field mode whereby the headset microphone array processing is configured to detect the voice of a far-field speaker (i.e., a person not wearing the headset) and eliminate other detected sound as noise. In a second mode, the headset is configured to operate in a near-field mode whereby the headset microphone array processing is configured to detect the voice of a near-field speaker (i.e., the headset wearer) and eliminate other detected sound as noise. In a third mode, the headset is configured to simultaneously operate in far-field mode and near field mode whereby the headset microphone array processing is configured to detect both a far-field speaker and the near-field speaker and eliminate other detected sound as noise.

FIG. 1 illustrates a simplified block diagram of a headset 2 in one example configured to implement one or more of the examples described herein. Examples of headset 2 include telecommunications headsets. The term "headset" as used herein encompasses any head-worn device operable as described herein.

In one example, a headset 2 includes a processor 4, a memory 6, a network interface 12, speaker(s) 14, and a user interface 28. The user interface 28 may include a multifunction power, volume, mute, and select button or buttons. Other user interfaces may be included on the headset, such as a link active/end interface. It will be appreciated that numerous other configurations exist for the user interface.

In one example, the network interface 12 is a wireless transceiver or a wired network interface. In one implementation, speaker(s) 14 include a first speaker worn on the user left ear to output a left channel of a stereo signal and a second speaker worn on the user right ear to output a right channel of the stereo signal.

The headset 2 includes a microphone 16 and a microphone 18 for receiving sound. For example, microphone 16 and microphone 18 may be utilized as a linear microphone array. In a further example, the microphone array may comprise more than two microphones. Microphone 16 and microphone 18 are installed at the lower end of a headset boom in one example.

Use of two or more microphones is beneficial to facilitate generation of high quality speech signals since desired vocal signatures can be isolated and destructive interference techniques can be utilized. Use of microphone 16 and microphone 18 allows phase information to be collected. Because each microphone in the array is a fixed distance relative to each other, phase information can be utilized to better pinpoint a far-field speech source and better pinpoint the location of noise sources and reduce noise.

Microphone 16 and microphone 18 may comprise either omni-directional microphones, directional microphones, or a mix of omni-directional and directional microphones. In telephony mode, microphone 16 and microphone 18 detect the voice of a headset user which will be the primary component of the audio signal, and will also detect secondary components which may include background noise and the output of the headset speaker. In interview mode, microphone 16 and microphone 18 detect both the voice of a far-field talker and the headset user.

Each microphone in the microphone array at the headset is coupled to an analog to digital (A/D) converter. Referring again to FIG. 1, microphone 16 is coupled to A/D converter 20 and microphone 18 is coupled to A/D converter 22. The analog signal output from microphone 16 is applied to A/D converter 20 to form individual digitized signal 24. Similarly, the analog signal output from microphone 18 is applied to A/D converter 22 to form individual digitized signal 26. A/D converters 20 and 22 include anti-alias filters for proper signal preconditioning.

Those of ordinary skill in the art will appreciate that the inventive concepts described herein apply equally well to microphone arrays having any number of microphones and array shapes which are different than linear. The impact of additional microphones on the system design is the added cost and complexity of the additional microphones and their mounting and wiring, plus the added A/D converters, plus the added processing capacity (processor speed and memory) required to perform processing and noise reduction functions on the larger array. Digitized signal 24 and digitized signal 26 output from A/D converter 20 and A/D converter 22 are received at processor 4.

Headset 2 may include a processor 4 operating as a controller that may include one or more processors, memory and software to implement functionality as described herein. The processor 4 receives input from user interface 28 and manages audio data received from microphones 16 and 18 and audio from a far-end user sent to speaker(s) 14. The processor 4 further interacts with network interface 12 to transmit and receive signals between the headset 2 and a computing device.

Memory 6 represents an article that is computer readable. For example, memory 6 may be any one or more of the following: random access memory (RAM), read only memory (ROM), flash memory, or any other type of article that includes a medium readable by processor 4. Memory 6 can store computer readable instructions for performing the execution of the various method embodiments of the present invention. Memory 6 includes an interview mode application program 8 and a telephony mode application program 10. In one example, the processor executable computer readable instructions are configured to perform part or all of a process such as that shown in FIG. 7 and FIGS. 8A-8C. Computer readable instructions may be loaded in memory 6 for execution by processor 4. In a further example, headset 2 may include additional operational modes. For example, headset 2 may include a dictation mode whereby dictation mode processing is performed to optimize the headset wearer voice for recording. In a further example, headset 2 includes a far-field only mode. For example, in far-field only mode, the user can select to put the headset in a mode to record and optimize just a far voice for future playback. This mode is particularly advantageous in use cases where a user attends a conference, or a student in a lecture would like to record the lecturer or speaker, process and then playback later on a computer, headset, or other audio device to help remember ideas or improve studying.

Network interface 12 allows headset 2 to communicate with other devices. Network interface 12 may include a wired connection or a wireless connection. Network interface 12 may include, but is not limited to, a wireless transceiver, an integrated network interface, a radio frequency transmitter/receiver, a USB connection, or other interfaces for connecting headset 2 to a telecommunications network such as a Bluetooth network, cellular network, the PSTN, or an IP network. For example, network interface 12 is a Bluetooth, Digital Enhanced Cordless Telecommunications (DECT), or IEEE 802.11 communications module configured to provide the wireless communication link. Bluetooth, DECT, or IEEE 802.11 communications modules include an antenna at both the receiving and transmitting end.

In a further example, the network interface 12 may include a controller which controls one or more operations of the headset 2. Network interface 12 may be a chip module. The headset 2 further includes a power source such as a rechargeable battery which provides power to the various components of the headset 2.

In one example operation, processor 4 executes telephony mode application program 10 to operate the headset 2 in a first mode utilizing a first set of signal processing parameters to process signals 24 and 26 and executes interview mode application program 8 to operate the headset 2 in a second mode utilizing a second set of signal processing parameters to process the signals 24 and 26.

In one example, the first set of signal processing parameters are configured to eliminate a signal component corresponding to a voice in proximity to a headset wearer and the second set of signal processing parameters are configured to detect and propagate the signal component corresponding to the voice in proximity to the headset wearer for recording at the headset or transmission to a remote device. The second set of signal processing parameters include a beam forming algorithm to isolate the voice in proximity to the headset wearer and a noise reduction algorithm to reduce ambient noise detected in addition to the voice in proximity to the headset wearer.

In a further example, the first set of signal processing parameters are configured to process sound corresponding to telephony voice communications between a headset wearer and a voice call participant, and the second set of signal processing parameters are configured to process sound corresponding to voice communications between the headset wearer and a conversation participant in adjacent proximity to the headset wearer. During the second mode the interview mode application program 8 is further configured to record the sound corresponding to voice communications between the headset wearer and a conversation participant in adjacent proximity to the headset wearer in the memory. In a further embodiment, during the second mode the interview mode application program 8 is further configured to transmit the sound corresponding to voice communications between the headset wearer and a conversation participant in adjacent proximity to the headset wearer to a remote device over the communications interface. As used herein, the term "remote device" refers to any computing device different from headset 2. For example, the remote device may be a mobile phone in wireless communication with headset 2.

In one example, the second set of signal processing parameters are further configured to normalize an audio level of a headset wearer speech and a conversation participant speech prior to recording or transmission. In one example, the second set of signal processing parameters are configured to process the sound to isolate a headset wearer voice in a first channel and isolate a conversation participant voice in a second channel. For example, the first channel and second channel may be a left channel and a right channel of a stereo signal. In one usage application, the first channel and the second channel are recorded separately as different electronic files. Each file may be processed separately, such as with a speech-to-text application. For example, such a process is advantageous where the speech-to-text application may be previously trained/configured to recognize one voice in one channel, but not the voice in the second channel.

In a further implementation, headset 2 further includes a sensor providing a sensor output, wherein the interview mode application program 8 is further configured to process the sensor output to determine a direction or a distance of a person associated with the a voice in proximity to a headset wearer, wherein the interview mode application program 8 is further configured to utilize the direction or the distance in the second set of signal processing parameters. For example, the sensor is a video camera, an infrared system, or an ultrasonic system.

In one example, a headset application is further configured to switch between the first mode and the second mode responsive to a user action received at the user interface 28. In a further example, the headset application is further configured to switch between the first mode and the second mode responsive to an instruction received from a remote device. In a further application, the headset 2 automatically determines which mode to operate in based on monitored headset activity, such as when the user receives an incoming call notification at the headset from a mobile phone.

In one example operation, headset 2 is operated in a first mode or a second mode. Headset 2 receives sound at the microphone array and converts the sound to an audio signal. During operation in the first mode, the headset 2 eliminates (i.e., filters out) a voice in proximity to a headset wearer in the audio signal. During operation in the second mode, the headset 2 detects and records the voice in proximity to the headset wearer in the audio signal, along with the voice of the headset wearer.

Figure 2:
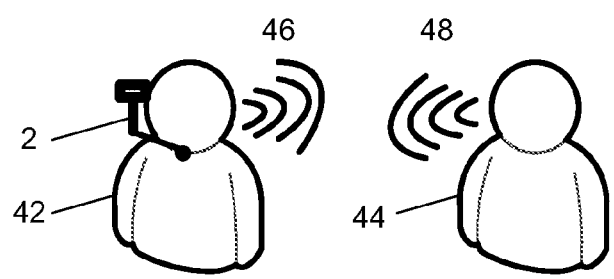
FIG. 2 illustrates a first example usage scenario in which the headset shown in FIG. 1 is utilized.

FIG. 2 illustrates a first example usage scenario in which the headset shown in FIG. 1 executes interview mode application 8. In the example shown in FIG. 2, a headset user 42 is wearing a headset 2. Headset user 42 is in conversation with a conversation participant 44. Headset 2 detects sound at microphone 16 and microphone 18, which in this scenario includes desirable speech 46 from headset user 42 and desirable speech 48 from conversation participant 44. The headset 2 utilizing interview mode application program 8 processes the detected speech using interview mode processing as described herein. For example, the interview mode processing may include directing a beamform at the conversation participant 44 mouth in order isolate and enhance desirable speech 48 for recording or transmission.

Figure 3:
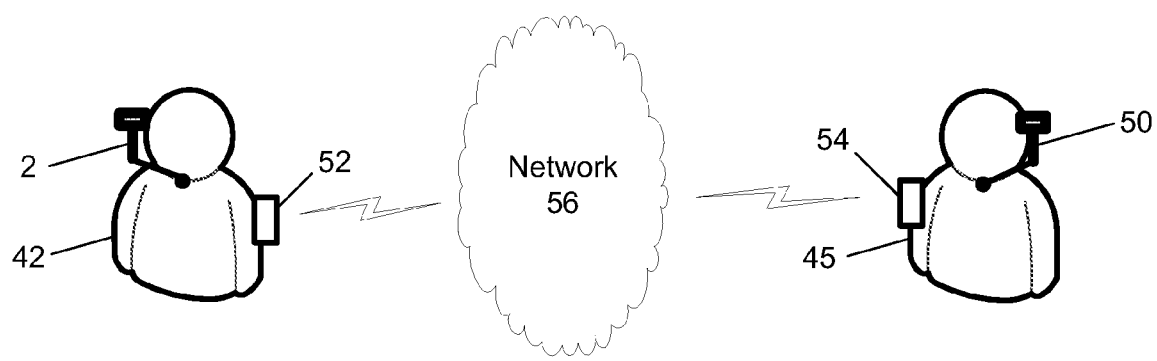
FIG. 3 illustrates a second example usage scenario in which the headset shown in FIG. 1 is utilized.

FIG. 3 illustrates a second example usage scenario in which the headset shown in FIG. 1 executes telephony mode application program 10. In the example shown in FIG. 3, a headset user 42 is utilizing a mobile phone 52 in conjunction with headset 2 to conduct a telephony voice call. Headset user 42 is in conversation with a far end telephony call participant 45 over network 56, such as a cellular communications network. Far end telephony call participant 45 is utilizing his mobile phone 54 in conjunction with his headset 50 to conduct the telephony voice call with headset user 42. Headset 2 detects sound at microphone 16 and microphone 18, which in this scenario includes desirable speech 46 from headset user 42. The sound may also include undesirable speech from call participant 44 output from the headset 2 speaker and undesirably detected by microphone 16 and microphone 18, as well as noise in the immediate area surrounding headset user 42. The headset 2 utilizing telephony mode application program 10 processes the detected sound using telephony mode processing as described herein.

Figure 4:
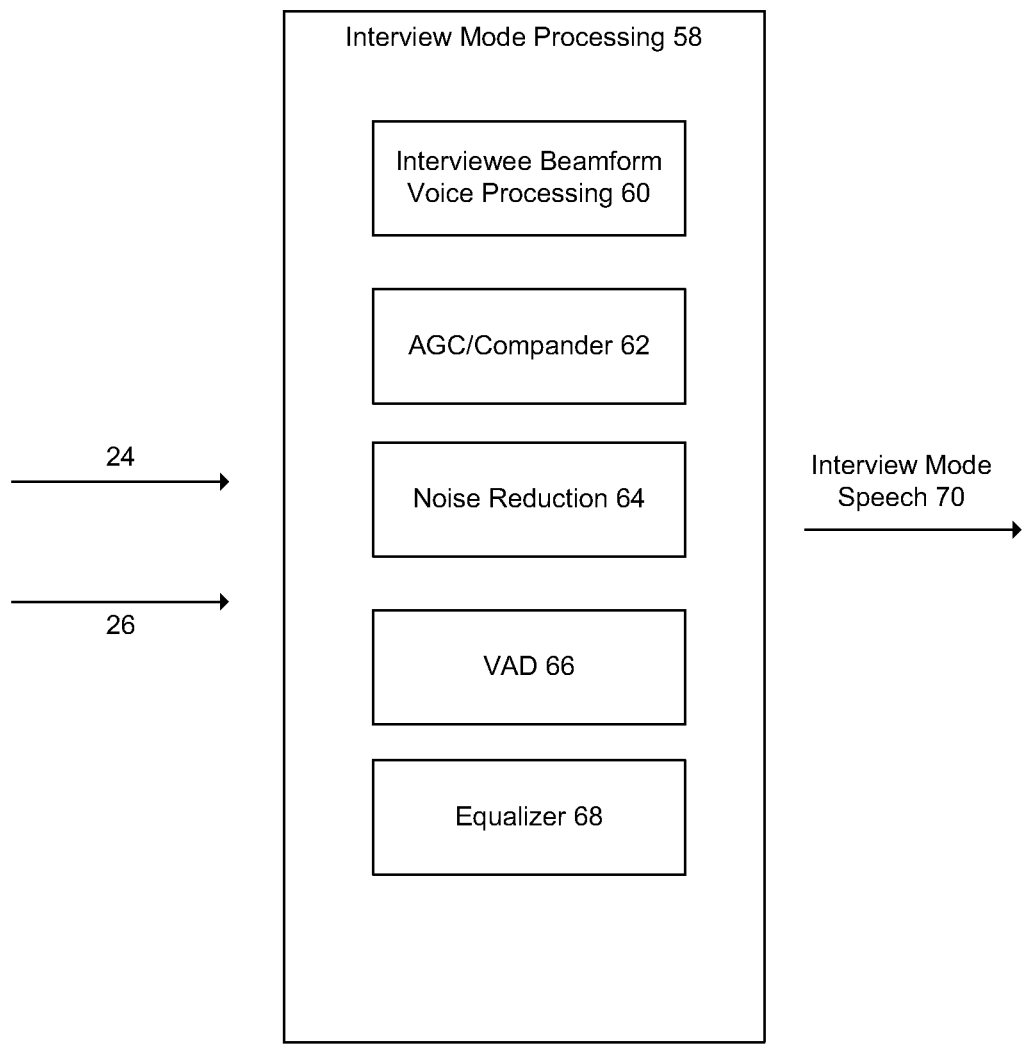
FIG. 4 illustrates an example signal processing during an interview mode operation.

FIG. 4 illustrates an example signal processing during an interview mode operation. Interview mode application program 8 performs interview mode processing 58, which may include a variety of signal processing techniques applied to signal 24 and signal 26. In one example, interview mode processing 58 includes interviewee beamform voice processing 60, automatic gain control and compander processing 62, noise reduction processing 64, voice activity detection 66, and equalizer processing 68. Following interview mode processing 58, a processed and optimized interview mode speech 70 is output.

Noise reduction processing 64 processes digitized signal 24 and digitized signal 26 to remove background noise utilizing a noise reduction algorithm. Digitized signal 24 and digitized signal 26 corresponding to the audio signal detected by microphone 16 and microphone 18 may comprise several signal components, including desirable speech 46, desirable speech 48, and various noise sources. Noise reduction processing 64 may comprise any combination of several noise reduction techniques known in the art to enhance the vocal to non-vocal signal quality and provide a final processed digital output signal. Noise reduction processing 64 utilizes both digitized signal 24 and digitized signal 26 to maximize performance of the noise reduction algorithms. Each noise reduction technique may address different noise artifacts present in the signal. Such techniques may include, but are not limited to noise subtraction, spectral subtraction, dynamic gain control, and independent component analysis.

In noise subtraction, noise source components are processed and subtracted from digitized signal 24 and digitized signal 26. These techniques include several Widrow-Hoff style noise subtraction techniques where voice amplitude and noise amplitude are adaptively adjusted to minimize the combination of the output noise and the voice aberrations. A model of the noise signal produced by the noise sources is generated and utilized to cancel the noise signal in the signals detected at the headset 2. In spectral subtraction, the voice and noise components of digitized signal 24 and digitized signal 26 are decomposed into their separate frequency components and adaptively subtracted on a weighted basis. The weighting may be calculated in an adaptive fashion using an adaptive feedback loop.

Noise reduction processing 64 further uses digitized signal 24 and digitized signal 26 in Independent Component Analysis, including blind source separation (BSS), which is particularly effective in reducing noise. Noise reduction processing 64 may also utilize dynamic gain control, "noise gating" the output during unvoiced periods.

The noise reduction processing 64 includes a blind source separation algorithm that separates the signals of the noise sources from the different mixtures of the signals received by each microphone 16 and 18. In further example, a microphone array with greater than two microphones is utilized, with each individual microphone output being processed. The blind source separation process separates the mixed signals into separate signals of the noise sources, generating a separate model for each noise source. The noise reduction techniques described herein are for example, and additional techniques known in the art may be utilized.

The individual digitized signals 24, 26 are input to interviewee beamform voice processing 60. Although only two digitized signals 24, 26 are shown, additional digitized signals may be processed. Interviewee beamform voice processing 60 outputs an enhanced voice signal. The digitized output signals 24, 26 are electronically processed by interviewee beamform voice processing 60 to emphasize sounds from a particular location (i.e., the conversation participant 44 mouth) and to de-emphasize sounds from other locations.

In one example, AGC of AGC/Compander 62 is utilized to balance the loudness between near-talker and the far-talker, but does so in combination with unique "Compander" settings. The AGC timing is made slightly faster than a conventional AGC to accomplish this.

In one example, compander of AGC/Compander 62 is utilized in combination with the AGC, and has unique compression (2:1 to 4:1) and expansion (1:3 to 1:7) settings. The compander works in multiple frequency bands in a manner that squelches very low level sounds, then becomes active for a threshold designed to capture the far talker's speech, adding significant gain to their lower level/energy speech signals. At the compression end, unique compressor settings prevent the near-talker from being too loud on speech peaks and other higher energy speech signals. The combined result of the AGC action and the compander substantially reduces the incoming dynamic range so that both talkers can be heard at reasonably consistent audio levels.

In one example, VAD 66 is utilizes a broad combination of signal characteristics including overall level, peak-to-average ratios (crest factor), slew rate/envelope characteristics, spectral characteristics and finally some directional characteristics. The ideal is to combine what is known of the surrounding audio environment to decide when someone is speaking, whether near or far. When speech is active, the noise filtering actions will freeze or slow to optimize quality, and not erroneously converge on valid speech (i.e., prevents filtering out the far talker speech signal).

In one example, Equalizer 68 is utilized as a filtering mechanism that balances the audible spectrum in a way that optimizes between speech intelligibility and natural sound. Unwanted spectrum (i.e., very low or very high frequencies) in the audio environment is also filtered out to enhance the signal to noise ratio where appropriate. The Equalizer 68 can be dynamic or fixed depending on the degree of optimization needed, and also the available processing capacity of the DSP.

This example uses the features provided from several different signal processing technologies in combination to provide an optimal voice output of both the headset wearer and the interviewee with minimal microphone background noise. The output of interview mode processing 58 is a processed interview mode speech 70 which has substantially isolated voice and reduced noise due to the beamforming, noise reduction, and other techniques described herein.

Figure 5:
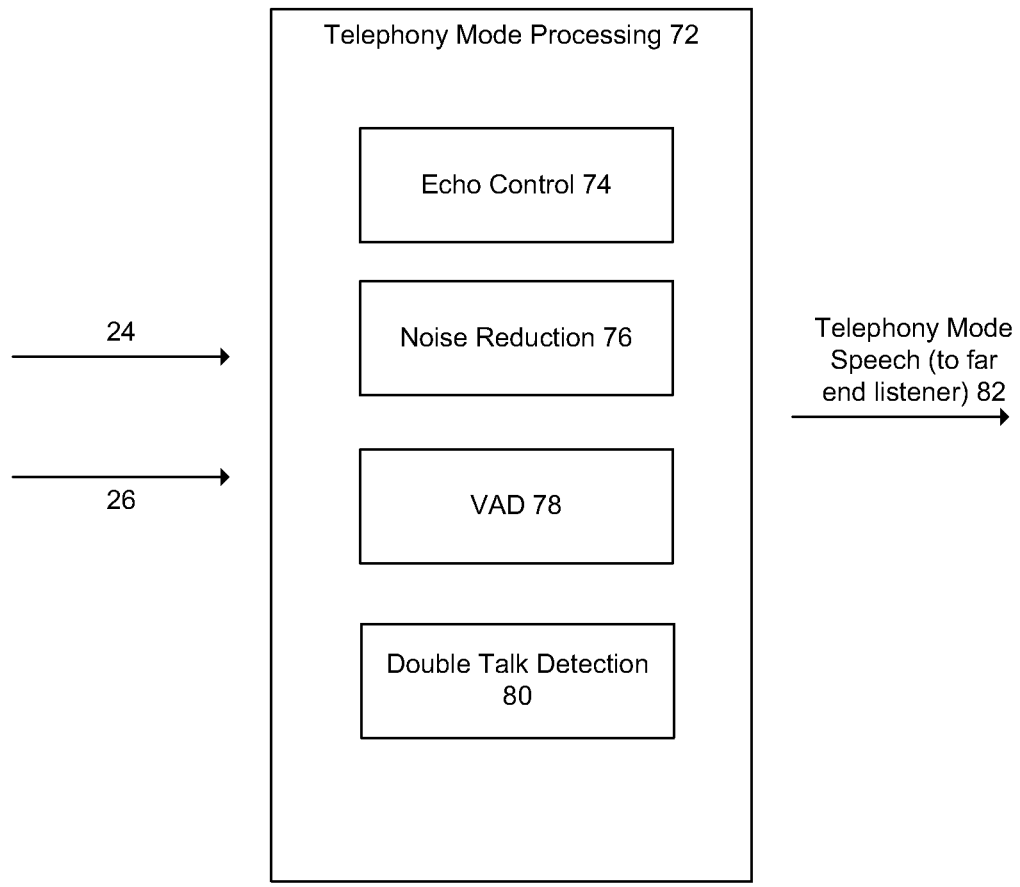
FIG. 5 illustrates an example signal processing during a telephony mode operation.

FIG. 5 illustrates an example signal processing during a telephony mode operation. Telephony mode application program 10 performs telephony mode processing 72, which may include a variety of signal processing techniques applied to signal 24 and signal 26. In one example, telephony mode processing 72 includes echo control processing 74, noise reduction processing 76, voice activity detection 78, and double talk detection 80. Following telephony mode processing 72, a processed and optimized telephony mode speech 82 is output for transmission to a far end call participant. In various examples, certain types of signal processing are performed both in interview mode processing 58 and telephony mode processing 72, but processing parameters and settings are adjusted based on the mode of operation. For example, during noise reduction processing, noise reduction settings and thresholds for interview mode processing 58 may pass through (i.e., not eliminate) detected far field sound having a higher dB level than settings for telephony mode processing 72 to account for the desired far-field speaker voice having a lower dB level than a near-field voice. This ensures the far-field speaker voice is not filtered out as undesirable noise.

Figure 6:
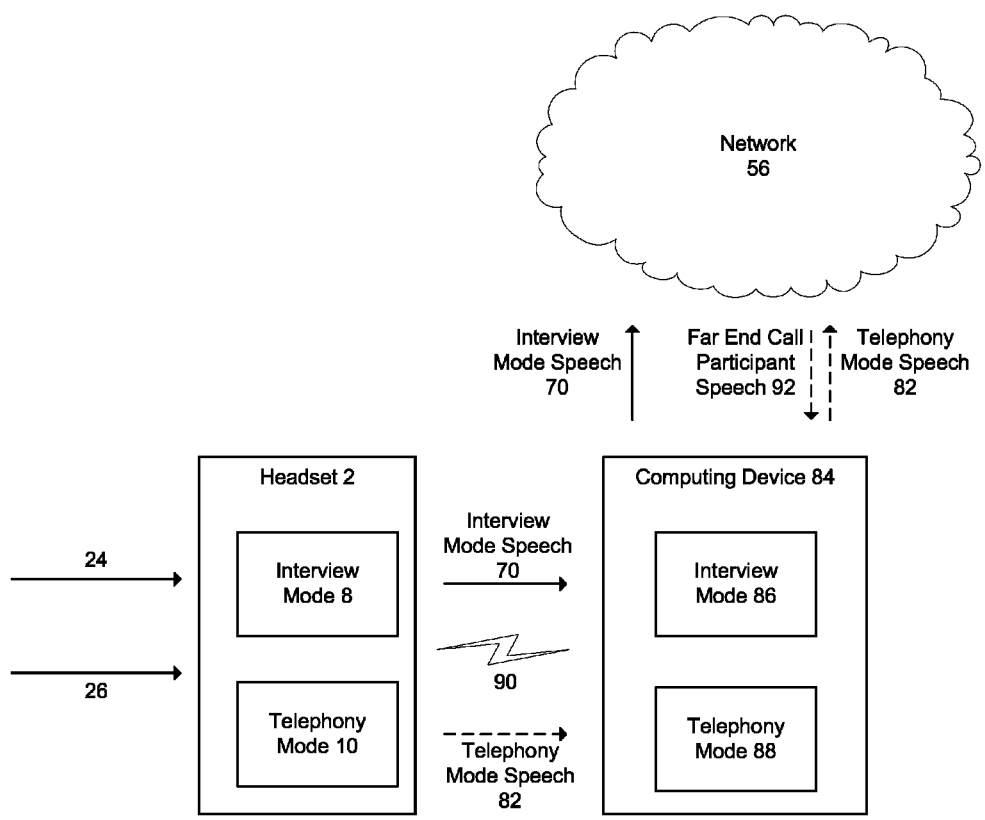
FIG. 6 illustrates an example implementation of the headset shown in FIG. 1 used in conjunction with a computing device.

FIG. 6 illustrates an example implementation of the headset 2 shown in FIG. 1 used in conjunction with a computing device 84. For example, computing device 84 may be a smartphone, tablet computer, or laptop computer. Headset 2 is connectible to computing device 84 via a communications link 90. Although shown as a wireless link, communications link 90 may be a wired or wireless link. Computing device 84 is capable of wired or wireless communication with a network 56. For example, network may be an IP network, cellular communications network, PSTN network, or any combination thereof.

In this example, computing device 84 executes an interview mode application 86 and telephony mode application 88. In one example, interview mode application 86 may transmit a command to headset 2 responsive to a user action at computing device 84, the command operating to instruct headset 2 to enter interview mode operation using interview mode application 8.

During interview mode operation, interview mode speech 70 is transmitted to computing device 84. In one example, the interview mode speech 70 is recorded and stored in a memory at computing device 84. In a further example, interview mode speech 70 is transmitted by computing device 84 over network 56 to a computing device coupled to network 56, such as a server.

During telephony mode operation, telephony mode speech 82 is transmitted to computing device 84 to be transmitted over network 56 to a telephony device coupled to network 56, such as a mobile phone used by a far end call participant. A far end call participant speech 92 is received at computing device 84 from network 56 and transmitted to headset 2 for output at the headset speaker.

In one example implementation of the system shown in FIG. 6, interview mode application 86 includes a "record mode" feature which may be selected by a user at a user interface of computing device 84. Responsive to the user selection to enter "record mode", interview mode application 86 sends an instruction to headset 2 to execute interview mode operation.

Figure 7:
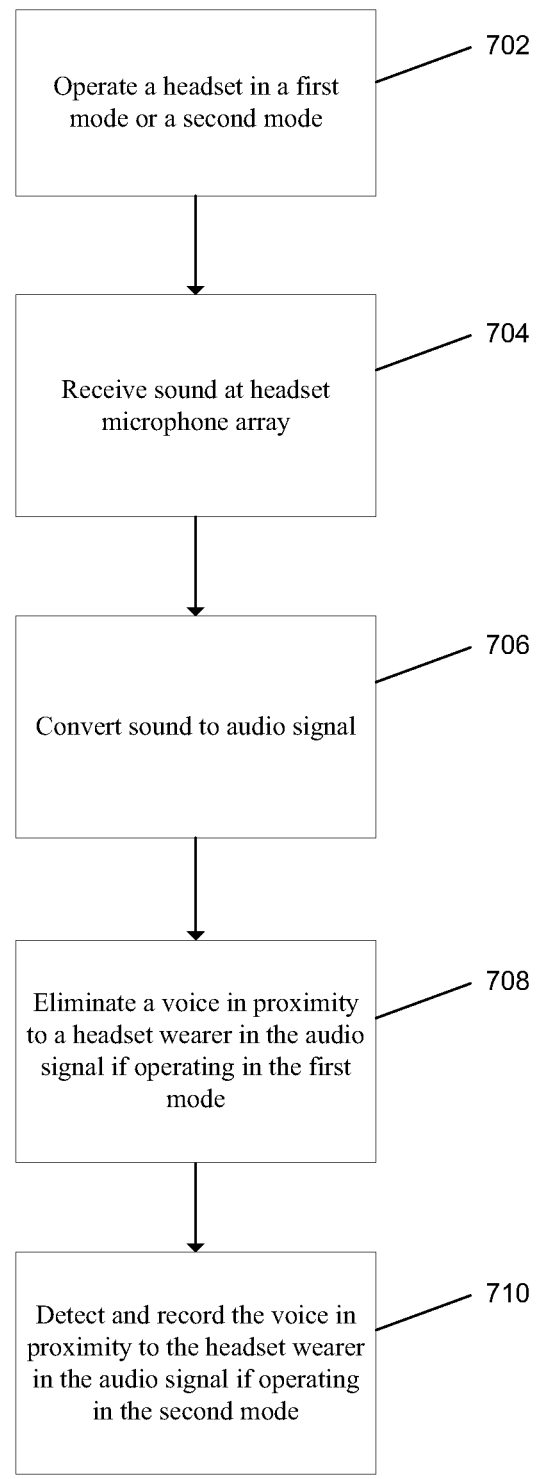
FIG. 7 is a flow diagram illustrating operation of a multi-mode headset in one example.

FIG. 7 is a flow diagram illustrating operation of a multi-mode headset in one example. At block 702, a headset is operated in a first mode or a second mode. In one example, the first mode includes telephony voice communications between a headset wearer and a voice call participant and the second mode includes voice communications between the headset wearer and a conversation participant in adjacent proximity to the headset wearer.

At block 704, sound is received at a headset microphone array. At block 706, the sound is converted to an audio signal. At block 708, the audio signal is processed to eliminate a voice in proximity to a headset wearer if the headset is operating in the first mode.

At block 710, the audio signal is processed to detect and record the voice in proximity to the headset wearer if the headset is operating in the second mode. In one example, detecting and recording the voice in proximity to the headset wearer in the audio signal in the second mode includes utilizing a beam forming algorithm to isolate the voice in proximity to the headset wearer.

In one example, the operations further include transmitting the voice in proximity to the headset wearer in the second mode to a remote device. In one example, the operations further include normalizing an audio level of a headset wearer speech and the voice in proximity to the headset wearer in the second mode.

In one example, the operations further include processing the audio signal to isolate a headset wearer voice in a first channel and isolate the voice in proximity to the headset wearer in a second channel in the second mode. In one example, the operations further include switching between the first mode and the second mode responsive to a user action received at a headset user interface or responsive to an instruction received from a remote device.

Figure 8A:
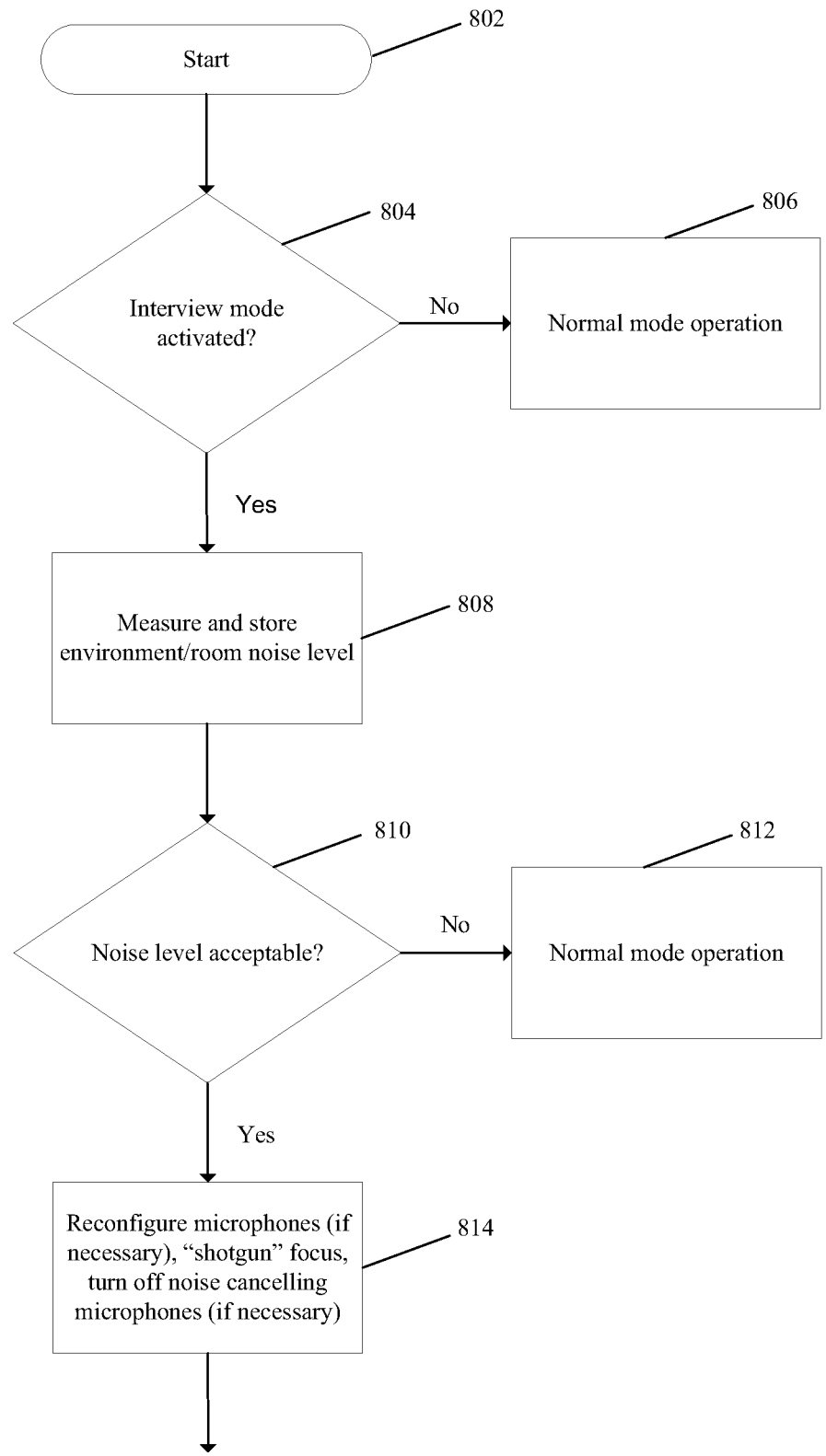
FIGS. 8A-8C are a flow diagram illustrating operation of a multi-mode headset in a further example.
Figure 8B:
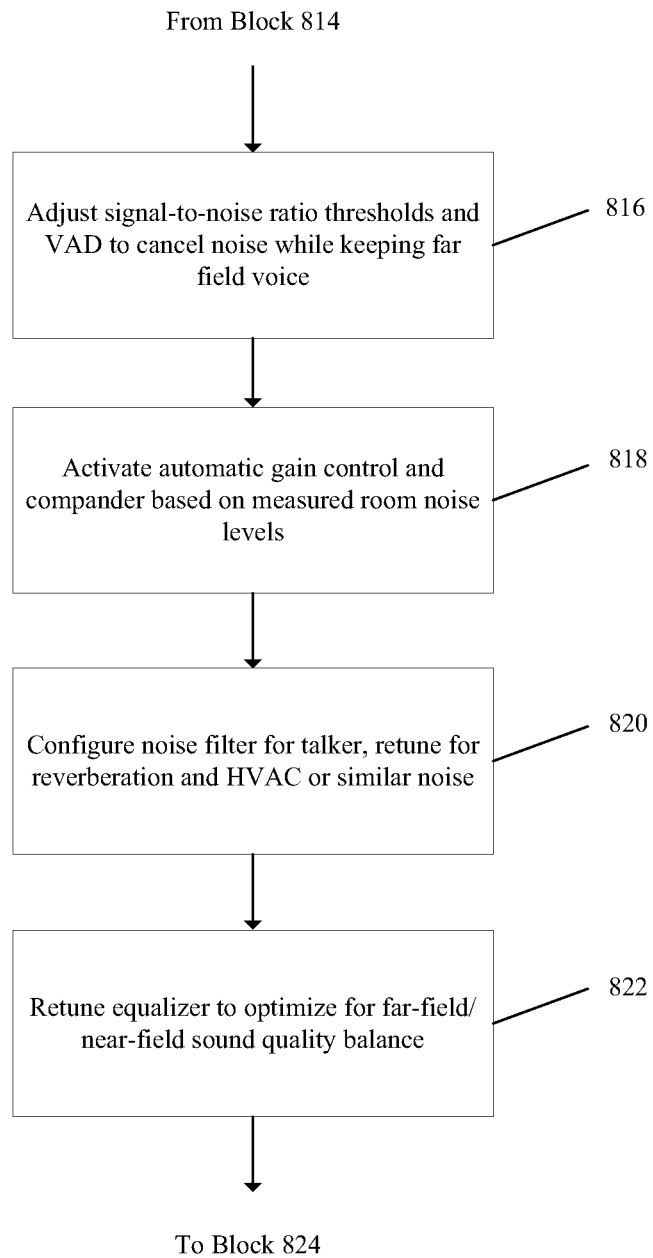
Figure 8C:
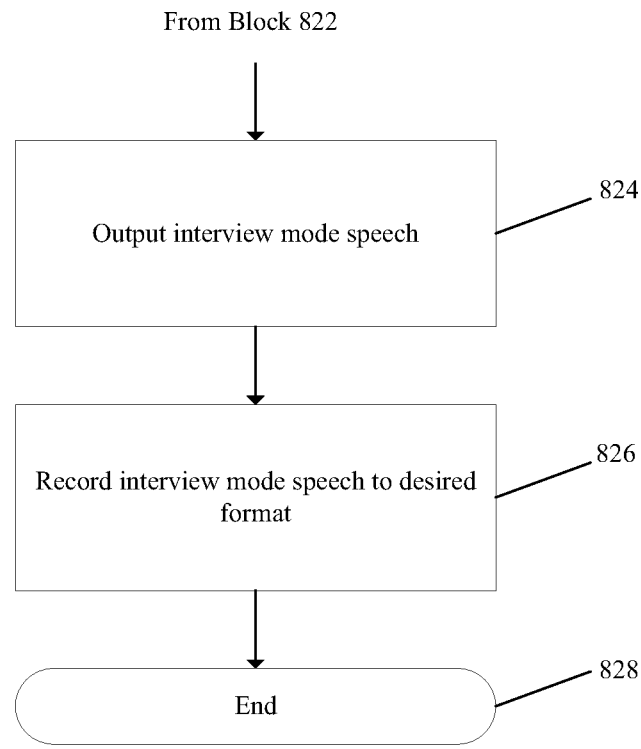

FIGS. 8A-8C are a flow diagram illustrating operation of a multi-mode headset in a further example. At block 802, operations begin. At decision block 804, it is determined whether interview mode is activated. In one example, the interview mode is activated by either a headset user interface button, a voice command received at the headset microphone, or an application program on a mobile device or PC in communication with the headset.

If no at decision block 802, at block 806 the headset operates in normal mode. During normal mode operation, the noise cancelling processing is optimized for transmit of the headset user voice. In one example, normal operation corresponds to typical settings for a telephony application usage of the headset. In a further example, normal operation corresponds to typical settings for a dictation application usage of the headset. If yes at decision block 802, at block 808 the environment/room noise level is measured and stored.

At decision block 810, it is determined whether the noise level is acceptable. If no at decision block 810, at block 812 the headset operates in normal mode. If yes at decision block 810, at block 814 the headset microphones are reconfigured if necessary to have a "shotgun" focus (i.e., form a beam in the direction of the interviewee mouth) and if necessary any noise cancelling microphones in operation are turned off.

At block 816, signal-to-noise ratio thresholds and a voice activity detector settings are adjusted to cancel noise while keeping the far field voice (i.e., the interviewee voice). At block 818, automatic gain control and compander processing is activated based on measured room noise levels.

At block 820, the noise filter is configured for the far field voice and retuned for reverberation and HVAC noise and similar noise. At block 822, the equalizer is retuned to optimize for far-field/near-field sound quality balance. For example, blocks 814-822 are performed by a digital signal processor. At block 824, interview mode speech is output. At block 826, the interview mode speech is recorded to the desired format. At block 828, operations end.

In one example, for headset users, it is desirable to wear the same device whether in a call, making an audio recording, or dictating to a speech-to-text engine. However, working well in some use cases requires different tunings to meet the requirements of that particular use. For example, during a telephone call, there is transmit speech and receive speech occurring at the same time, requiring echo cancellation and weighted terminal coupling loss (TCLw) solutions, often achieved through sophisticated signal processing such as digital signal processing (DSP). Yet, if the user were using the device for making a recording or to dictate to a speech-to-text engine, then the receive channel may not be required and signal processing to provide the TCLw solution and echo cancellation no longer becomes necessary.

The transmit audio signal can be tuned and optimized through passive filtering, signal processing, acoustic tuning, and component placement as well as designed with wearing style, microphone placement and boom length to provide improvements in the desired outcome. The desired income may, for example, be improved transmit in windy environments, improved transmit in noisy environments, desirable short-boom design while providing some transmit noise reduction, etc.

Design of communication devices often requires making trade-offs that improve some characteristic at the expense of others. That is, some transmit signal tuning can greatly improve the audio signal for improved intelligibility in certain environments, yet may have an unintended impact or compromise in other environments. Examples include when multiple microphones are used on shorter boom designs with DSP to improve transmit noise reduction and address echo and TCLw, the speech recognition can become less accurate due to the significant processing of the speech.

In one example, a headset includes a processor, a communications interface, a user interface, a speaker arranged to output audible sound to a headset wearer ear, and a microphone arranged to detect sound and output a microphone output signal. The headset further includes a memory storing an application executable by the processor configured to operate the headset in a first mode comprising a dictation mode utilizing a first set of signal processing parameters to process the microphone output signal and operate the headset in a second mode utilizing a second set of signal processing parameters to process the microphone output signal.

In one example, one or more non-transitory computer-readable storage media having computer-executable instructions stored thereon which, when executed by one or more computers, cause the one more computers to perform operations including receiving sound at a headset microphone and converting the sound to an audio signal. The operations include operating a headset having a selectable dictation mode and a telephony mode in the dictation mode or the telephony mode, the dictation mode utilizing a first set of signal processing parameters and the telephony mode utilizing a second set of signal processing parameters.

In one example, a method includes operating a headset having a selectable dictation mode and a telephony mode in the dictation mode or the telephony mode, the dictation mode utilizing a first set of signal processing parameters and the telephony mode utilizing a second set of signal processing parameters. The method includes receiving sound at a headset microphone and converting the sound to an audio signal, and detecting a headset wearer voice in the audio signal and eliminating a voice call participant voice output from the headset speaker in the audio signal in the telephony mode. The method further includes detecting the headset wearer voice in the audio signal in the dictation mode.

In one example embodiment of the invention, a dictation mode for headsets, or other communications devices, provides a solution for switching to an optimized-for-dictation-mode, or "dictation-mode" when desired. In one embodiment, the device uses two or more transmit tunings and the device is dynamically (e.g., automatically) switched to the appropriate tuning depending on what the user is doing at a certain point in time.

Each transmit tuning may utilize different operating devices and processes. For example, transmit tunings may vary by:

(1) Enabling or disabling DSP processing. Speech recognition has been shown in some cases to work better when there is no DSP processing on the microphone signal, but telephony requires some degree of processing on the microphone signal to remove noise.

(2) Using a single microphone vs. multiple microphones. Speech recognition works better with a single microphone but telephony requires suppression of background audio by the use of multiple microphones.

(3) Different DSP algorithms for speech processing and noise elimination. For example, the DSP processing for speech recognition might include spectral subtraction for background noise but may not involve any sub-band specific processing. For telephony, on the other hand, there may be additional processing in specific sub-bands.

(4) Using different specific audio codecs and modes of wireless transmission that optimize different characteristics. For example, telephony requires the use of a standards-based audio codec that would not need to be decoded and re-coded on the way to the final endpoint, in order to reduce distortion and latency. However, a lossless codec is more important for speech recognition, hence a proprietary lossless codec could be used. In order to ensure error recovery, a telephony audio payload might use FEC (Forward Error Correction) over the wireless link since retransmissions are not recommended for isochronous links. For dictation, on the other hand, it would be acceptable to use more bandwidth for audio rather than FEC, and have a packet re-transmission scheme or other schemes to ensure packet reliability.

With multiple transmit tunings available to the headset, the user can manually switch between them, or have the device automatically switch when it receives a signal that the audio gateway (AG) has sent the appropriate signal. The speech-to-text engine can be running on a computer in a variety of places, such as a PC, smartphone, tablet computer, or in the cloud. In one example, when the speech-to-text engine is initiated, it sends a signal to the connected headset to switch to dictation mode. At the end of the dictation session, the headset is commanded to switch back into telephony mode. In further examples, there may be alternate mechanisms to switch back into telephony mode, such as inactivity timers, or handling an incoming or outgoing call. For example, if an incoming call is answered while in dictation mode, the headset switches back to telephony mode. Once the call is ended, the dictation application initiates again and the headset switches to dictation mode.

In further examples, the command to switch operating modes comes from a different device than the one hosting the speech-to-text engine. For example, a smartphone application might command the headset to switch modes, and also trigger a dictation engine in the cloud.

The methods and systems described offer a variety of advantages, including improving fidelity for speech recognition and dictation without impacting audio quality for telephony. The speech processing, encoding and wireless transmission can all be optimized differently for dictation than for telephony. The user can take a call and the headset will be in the correct and optimized tuning for the telephone call. And then, when he/she initiates dictation, the device switches to the dictation-mode, thereby allowing for greater speech-to-text accuracy.

Figure 9:
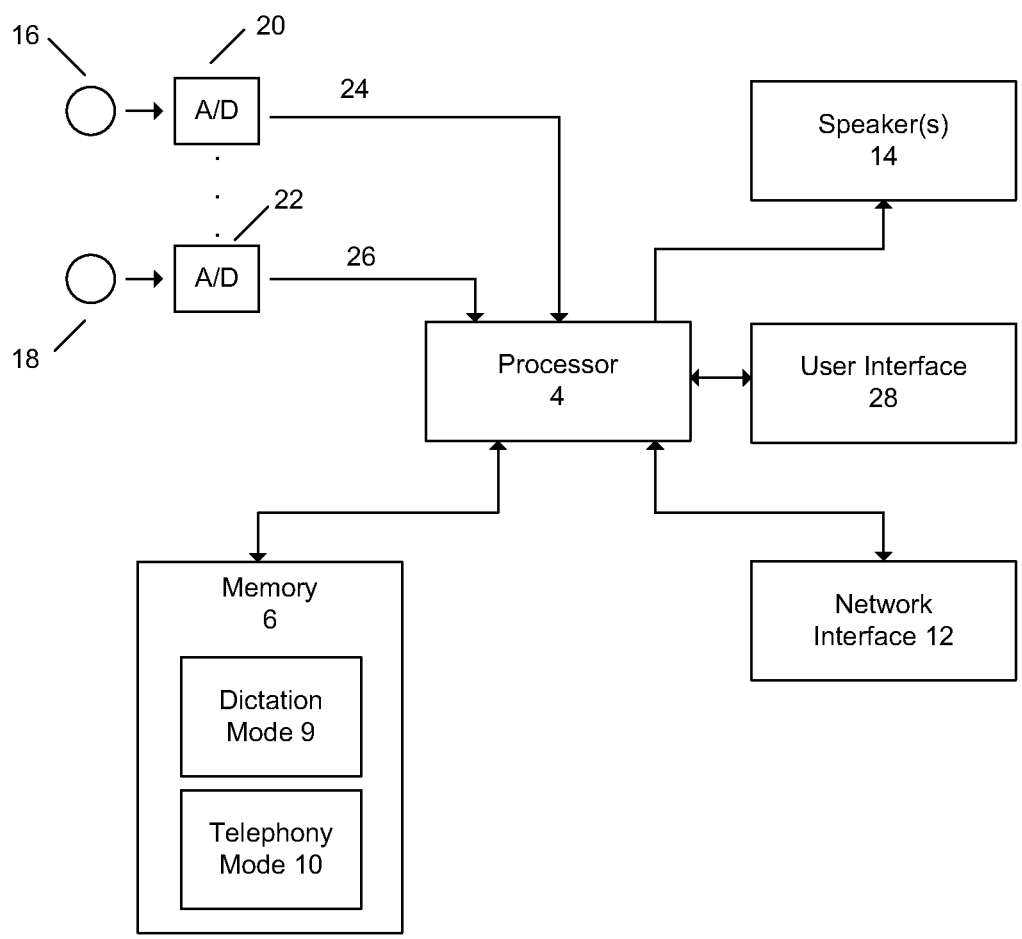
FIG. 9 illustrates a simplified block diagram of a headset in one example configured to implement one or more of the examples described herein.

FIG. 9 illustrates a simplified block diagram of a headset 2 in a further example configured to implement one or more of the examples described herein. In this example, a headset 2 includes a processor 4, a memory 6, a network interface 12, speaker(s) 14, and a user interface 28. The user interface 28 may include a multifunction power, volume, mute, and select button or buttons. Other user interfaces may be included on the headset, such as a link active/end interface. It will be appreciated that numerous other configurations exist for the user interface.

In one example, the network interface 12 is a wireless transceiver or a wired network interface. In one implementation, speaker(s) 14 include a first speaker worn on the user left ear to output a left channel of a stereo signal and a second speaker worn on the user right ear to output a right channel of the stereo signal.

The headset 2 includes a microphone 16 and a microphone 18 for receiving sound. For example, microphone 16 and microphone 18 may be utilized as a linear microphone array. In a further example, the microphone array may comprise more than two microphones. In a further example, the headset 2 may utilize only a single microphone. Microphone 16 and microphone 18 are installed at the lower end of a headset boom in one example.

Use of two or more microphones is beneficial to facilitate generation of high quality speech signals since desired vocal signatures can be isolated and destructive interference techniques can be utilized. Use of microphone 16 and microphone 18 allows phase information to be collected. Because each microphone in the array is a fixed distance relative to each other, phase information can be utilized to better pinpoint a far-field speech source and better pinpoint the location of noise sources and reduce noise.

Microphone 16 and microphone 18 may comprise either omni-directional microphones, directional microphones, or a mix of omni-directional and directional microphones. In telephony mode, microphone 16 and microphone 18 detect the voice of a headset user which will be the primary component of the audio signal, and will also detect secondary components which may include background noise and the output of the headset speaker. In dictation mode, microphone 16 and microphone 18 detect the voice of a headset user which will be the primary component of the audio signal, and will also detect secondary components which may include background noise and background voices. In dictation mode, there will be no sound output of the headset speaker corresponding to the voice of a far end call participant which is detected by microphone 16 and microphone 18.

Each microphone in the microphone array at the headset is coupled to an analog to digital (A/D) converter. Referring again to FIG. 9, microphone 16 is coupled to A/D converter 20 and microphone 18 is coupled to A/D converter 22. The analog signal output from microphone 16 is applied to A/D converter 20 to form individual digitized signal 24. Similarly, the analog signal output from microphone 18 is applied to A/D converter 22 to form individual digitized signal 26. A/D converters 20 and 22 include anti-alias filters for proper signal preconditioning.

Those of ordinary skill in the art will appreciate that the inventive concepts described herein apply equally well to microphone arrays having any number of microphones and array shapes which are different than linear. The impact of additional microphones on the system design is the added cost and complexity of the additional microphones and their mounting and wiring, plus the added A/D converters, plus the added processing capacity (processor speed and memory) required to perform processing and noise reduction functions on the larger array. Digitized signal 24 and digitized signal 26 output from A/D converter 20 and A/D converter 22 are received at processor 4.

Headset 2 may include a processor 4 operating as a controller that may include one or more processors, memory and software to implement functionality as described herein. The processor 4 receives input from user interface 28 and manages audio data received from microphones 16 and 18 and audio from a far-end user sent to speaker(s) 14. The processor 4 further interacts with network interface 12 to transmit and receive signals between the headset 2 and a computing device.

Memory 6 represents an article that is computer readable. For example, memory 6 may be any one or more of the following: random access memory (RAM), read only memory (ROM), flash memory, or any other type of article that includes a medium readable by processor 4. Memory 6 can store computer readable instructions for performing the execution of the various method embodiments of the present invention. Memory 6 includes a dictation mode application program 9 and a telephony mode application program 10. The telephony mode application program 10 may be operable as previously described. In one example, the processor executable computer readable instructions are configured to perform part or all of a process such as that shown in FIG. 13. Computer readable instructions may be loaded in memory 6 for execution by processor 4.

In a further example, headset 2 may include additional operational modes. For example, headset 2 may include an interview mode operable as previously described herein. In a further example, headset 2 includes a far-field only mode. For example, in far-field only mode, the user can select to put the headset in a mode to record and optimize just a far voice for future playback. This mode is particularly advantageous in use cases where a user attends a conference, or a student in a lecture would like to record the lecturer or speaker, process and then playback later on a computer, headset, or other audio device to help remember ideas or improve studying.

Network interface 12 allows headset 2 to communicate with other devices. Network interface 12 may include a wired connection or a wireless connection. Network interface 12 may include, but is not limited to, a wireless transceiver, an integrated network interface, a radio frequency transmitter/receiver, a USB connection, or other interfaces for connecting headset 2 to a telecommunications network such as a Bluetooth network, cellular network, the PSTN, or an IP network. For example, network interface 12 is a Bluetooth, Digital Enhanced Cordless Telecommunications (DECT), or IEEE 802.11 communications module configured to provide the wireless communication link. Bluetooth, DECT, or IEEE 802.11 communications modules include an antenna at both the receiving and transmitting end.

In a further example, the network interface 12 may include a controller which controls one or more operations of the headset 2. Network interface 12 may be a chip module. The headset 2 further includes a power source such as a rechargeable battery which provides power to the various components of the headset 2.

In one example operation, processor 4 executes dictation mode application program 9 to operate the headset 2 in a dictation mode utilizing a first set of signal processing parameters to process the signals 24 and 26 and executes telephony mode application program 10 to operate the headset 2 in a telephony mode utilizing a second set of signal processing parameters to process signals 24 and 26. In one example, only one of signal 24 or signal 26 is processed during dictation mode.

In one example, the first set of signal processing parameters are configured to detect and propagate a signal component corresponding to a voice of the headset wearer for recording at the headset or a remote device. In one example, the first set of signal processing parameters are configured to optimize the microphone output signal for speech-to-text conversion. In one example, the second set of signal processing parameters are configured to process sound corresponding to telephony voice communications between a headset wearer and a voice call participant.

In one example, a headset application is further configured to switch between the dictation mode and the telephony mode responsive to a user action received at the user interface. In one example, the headset application is further configured to switch between the dictation mode and the telephony mode responsive to an instruction received from a device in communication with the headset.

In one example, the headset application is further configured to switch operation of the headset from the dictation mode to the telephony mode responsive to answering an incoming call notification or responsive to initiation of an outgoing call. In one example, the headset application is further configured to switch operation of the headset from the telephony mode to the dictation mode responsive to receiving notification of activation of a speech-to-text application and switch operation from the dictation mode to the telephony mode responsive to receiving notification of termination of the speech-to text application.

In one example, the headset application is configured to alter a speech processing, an audio encoding, or a wireless transmission mode of the microphone output signal when the headset is switched from the dictation mode to the telephony mode or switched from the telephony mode to the dictation mode.

In one example, the headset application is further configured to output an audio signal to a headset wearer at the headset speaker during the dictation mode. For example, the audio signal may be an earcon. In one example, the audio signal is a metronome tone to assist the user in the dictation process. In a further example, the audio signal is an earcon. For example, the earcon may notify the headset wearer that a spoken speech has not been recognized by the speech-to-text engine, or that the user speech is too fast for conversion. The wearer may also be given the option to hear the last captured text read back to her to allow the wearer to determine whether the speech-to-text conversion was accurate. In addition to audio feedback, other feedback such as haptic feedback or visual feedback (e.g., at the mobile device or PC) may be provided to the wearer.

In one example, the headset application is further configured to reconfigure the user interface responsive to whether the headset is operating in the dictation mode or the telephony mode. For example, during dictation mode, special headset user interface button commands, gesture commands, or speech commands are enabled. For example, during dictation mode, a nod of the user head detected by the headset (e.g., having a motion detector such as an accelerometer) may indicate acceptance of a dictated word. User interface control may also be received at a mobile device or PC user interface, such as a visual display.

In one example operation, headset 2 is operated in a dictation mode or a telephony mode. Headset 2 receives sound at a headset microphone and converts the sound to an audio signal. Headset 2 detects a headset wearer voice in the audio signal and eliminates a voice call participant voice output from the headset speaker in the audio signal (thereby reducing acoustic echo) in the telephony mode. Headset 2 detects the headset wearer voice in the audio signal in the dictation mode.

Figure 10:
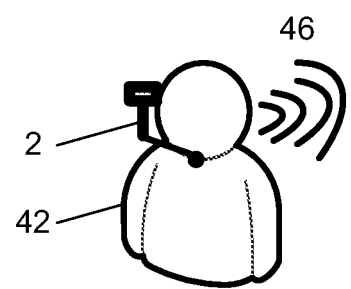
FIG. 10 illustrates an example usage scenario in which the headset shown in FIG. 9 is utilized.

FIG. 10 illustrates an example usage scenario in which the headset shown in FIG. 9 executes dictation mode application program 9. In the example shown in FIG. 10, a headset user 42 is wearing a headset 2. Headset user 42 is dictating speech for either recording and/or speech-to-text conversion. Headset 2 detects sound at microphone 16 and microphone 18, which in this scenario includes desirable speech 46 from headset user 42. The headset 2 utilizing dictation mode application program 9 processes the detected speech using dictation mode processing as described herein. For example, the dictation mode processing may include optimizing the detected user voice for speech-to-text conversion and/or recording.

Figure 11:
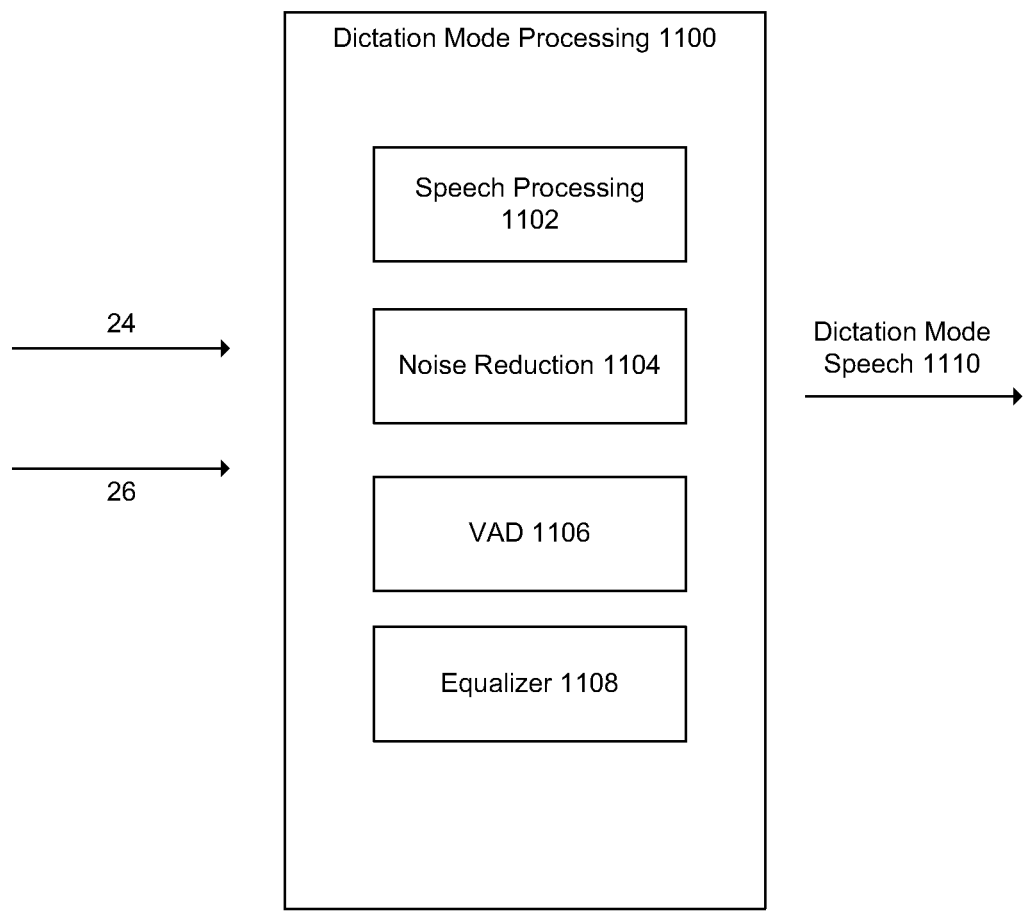
FIG. 11 illustrates an example signal processing during a dictation mode operation.

FIG. 11 illustrates an example signal processing during a dictation mode operation. Dictation mode application program 9 performs dictation mode processing 1100, which may include a variety of signal processing techniques applied to signal 24 and/or signal 26. In one example, dictation mode processing 1100 includes speech processing 1102, noise reduction processing 1104, voice activity detection 1106, and equalizer processing 1108. Following dictation mode processing 1100, a processed and optimized dictation mode speech 1110 is output.

Noise reduction processing 1104 processes digitized signal 24 and digitized signal 26 to remove background noise utilizing a noise reduction algorithm. Digitized signal 24 and digitized signal 26 corresponding to the audio signal detected by microphone 16 and microphone 18 may comprise several signal components, including desirable speech 46 and various noise sources. Noise reduction processing 1104 may comprise any combination of several noise reduction techniques known in the art to enhance the vocal to non-vocal signal quality and provide a final processed digital output signal. Each noise reduction technique may address different noise artifacts present in the signal. Such techniques may include, but are not limited to noise subtraction, spectral subtraction, dynamic gain control, and independent component analysis.

In noise subtraction, noise source components are processed and subtracted from digitized signal 24 and digitized signal 26. These techniques include several Widrow-Hoff style noise subtraction techniques where voice amplitude and noise amplitude are adaptively adjusted to minimize the combination of the output noise and the voice aberrations. A model of the noise signal produced by the noise sources is generated and utilized to cancel the noise signal in the signals detected at the headset 2. In spectral subtraction, the voice and noise components of digitized signal 24 and digitized signal 26 are decomposed into their separate frequency components and adaptively subtracted on a weighted basis. The weighting may be calculated in an adaptive fashion using an adaptive feedback loop.

Noise reduction processing 1104 further uses digitized signal 24 and digitized signal 26 in Independent Component Analysis, including blind source separation (BSS), which is particularly effective in reducing noise. Noise reduction processing 1104 may also utilize dynamic gain control, "noise gating" the output during unvoiced periods.

The noise reduction processing 1104 includes a blind source separation algorithm that separates the signals of the noise sources from the different mixtures of the signals received by each microphone 16 and 18. In further example, a microphone array with greater than two microphones is utilized, with each individual microphone output being processed. The blind source separation process separates the mixed signals into separate signals of the noise sources, generating a separate model for each noise source. The noise reduction techniques described herein are for example, and additional techniques known in the art may be utilized.

In one example, VAD 1106 is utilizes a broad combination of signal characteristics including overall level, peak-to-average ratios (crest factor), slew rate/envelope characteristics, spectral characteristics, and directional characteristics. The ideal is to combine what is known of the surrounding audio environment to decide when the headset wearer is speaking.

In one example, equalizer 1108 is utilized as a filtering mechanism that balances the audible spectrum in a way that optimizes between speech intelligibility and natural sound. Unwanted spectrum (i.e., very low or very high frequencies) in the audio environment is also filtered out to enhance the signal to noise ratio where appropriate. The equalizer 1108 can be dynamic or fixed depending on the degree of optimization needed, and also the available processing capacity of the DSP.

This example uses the features provided from several different signal processing technologies in combination to provide an optimal voice output of the headset wearer with minimal microphone background noise. The output of dictation mode processing 1100 is a processed dictation mode speech 1110 which has substantially isolated voice and reduced noise due to the noise reduction, and other techniques described herein. Additional techniques may also be used, such as voice beamforming, wideband audio processing, and automatic gain control.

Figure 12:
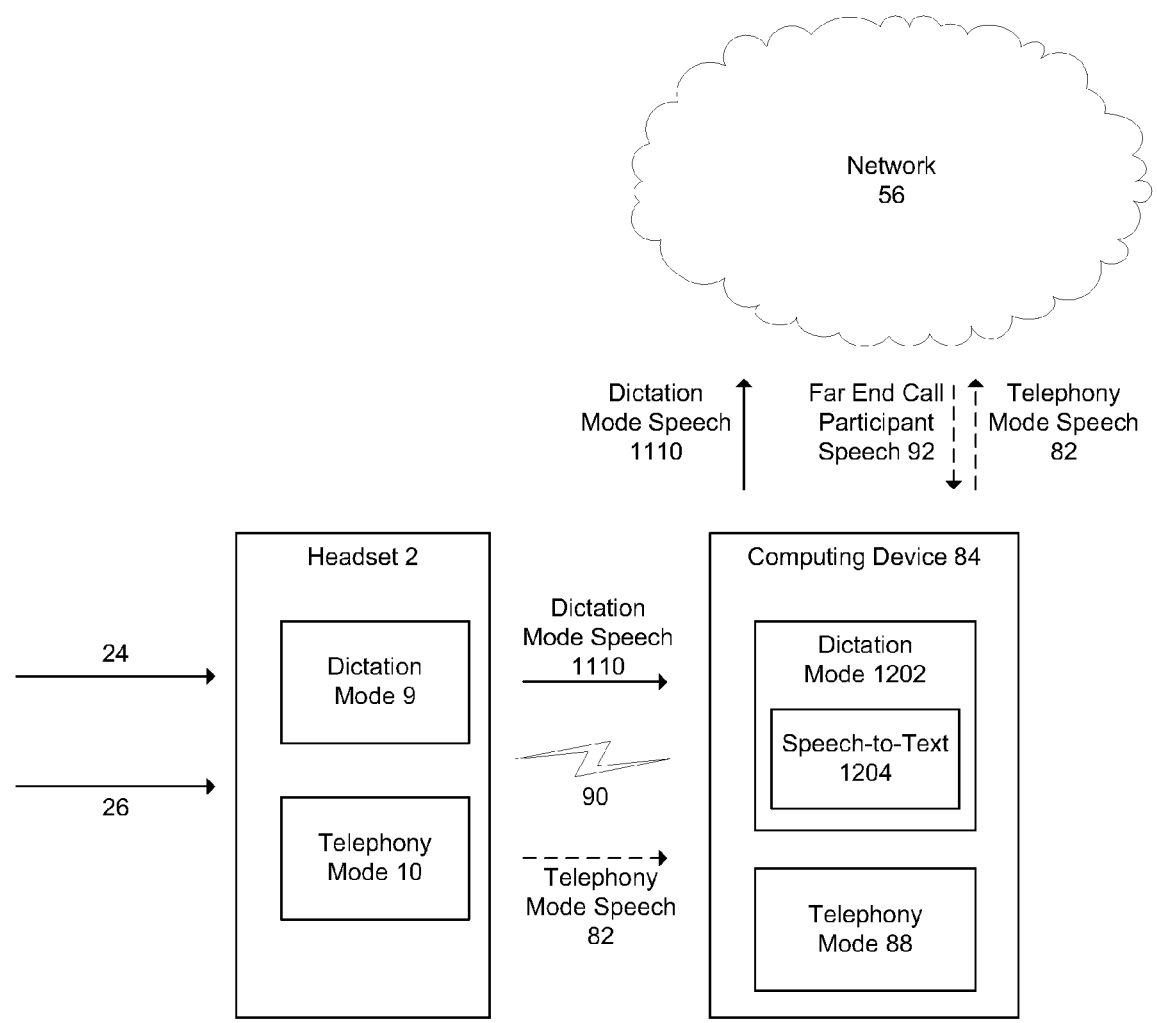
FIG. 12 illustrates an example implementation of the headset shown in FIG. 9 used in conjunction with a computing device.

FIG. 12 illustrates an example implementation of the headset 2 shown in FIG. 9 used in conjunction with a computing device 84. For example, computing device 84 may be a smartphone, tablet computer, desktop PC, or laptop computer. Headset 2 is connectible to computing device 84 via a communications link 90. Although shown as a wireless link, communications link 90 may be a wired or wireless link. Computing device 84 is capable of wired or wireless communication with a network 56. For example, network may be an IP network, cellular communications network, PSTN network, or any combination thereof.

In this example, computing device 84 executes a dictation mode application 1202 and telephony mode application 88. In one example, dictation mode application 1202 may transmit a command to headset 2 responsive to a user action at computing device 84, the command operating to instruct headset 2 to enter dictation mode operation using dictation mode application program 9. In one example, dictation mode application 1202 includes or interfaces with a speech-to-text application 1204 which converts dictation mode speech 1110 to text for saving in a text-based file. When speech-to-text application 1204 is launched, a command is sent from computing device 84 to instruct headset 2 to enter dictation mode operation using dictation mode application program 9. When speech-to-text application 1204 is closed, a command is sent from computing device 84 to instruct headset 2 to return to telephony mode operation.

During dictation mode operation, dictation mode speech 1110 is transmitted to computing device 84. In one example, the dictation mode speech 1110 is recorded and stored in a memory at computing device 84. In one example, dictation mode speech 1110 is converted from speech to text using speech-to-text application 1204. In a further example, dictation mode speech 1110 is transmitted by computing device 84 over network 56 to a computing device coupled to network 56, such as a server. Dictation mode speech 1110 may be recorded and/or converted to text at the server.

During telephony mode operation, telephony mode speech 82 is transmitted to computing device 84 to be transmitted over network 56 to a telephony device coupled to network 56, such as a mobile phone used by a far end call participant. A far end call participant speech 92 is received at computing device 84 from network 56 and transmitted to headset 2 for output at the headset speaker.

In one example implementation of the system shown in FIG. 12, dictation mode application 1202 includes a "record mode" feature which may be selected by a user at a user interface of computing device 84. Responsive to the user selection to enter "record mode", dictation mode application 1202 sends an instruction to headset 2 to activate dictation mode operation.

Figure 13:
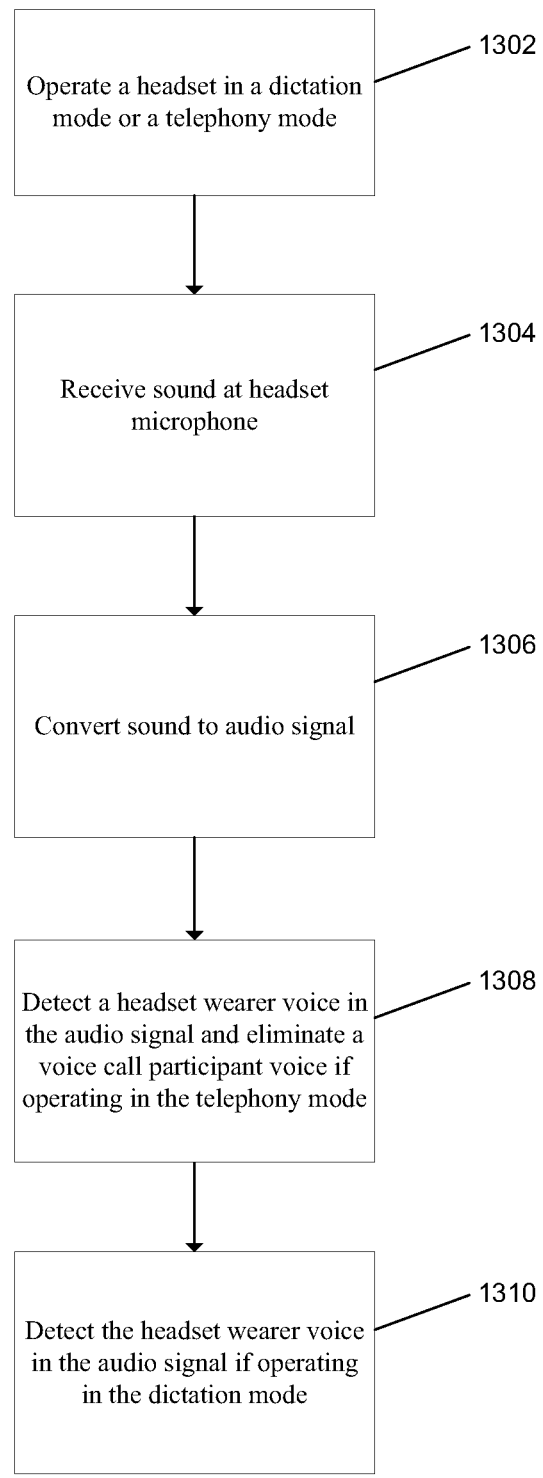
FIG. 13 is a flow diagram illustrating operation of a multi-mode headset in one example.

FIG. 13 is a flow diagram illustrating operation of a multi-mode headset in one example. At block 1302, a headset having a selectable dictation mode and a telephony mode is operated in the dictation mode or the telephony mode. In one example, when operating in the dictation mode, a first set of signal processing parameters stored at the headset is utilized. When operating in the telephony mode, a second set of signal processing parameters stored at the headset is utilized.

At block 1304, sound is received at the headset microphone. At block 1306, the sound is converted to an audio signal. At block 1308, a headset wearer voice in the audio signal is detected and a voice call participant voice output from the headset speaker in the audio signal is eliminated in the telephony mode.

At block 1310, the headset wearer voice in the audio signal is detected in the dictation mode. In one example, the method further includes recording the headset wearer voice at the headset or a remote device during operation in the dictation mode. In one example, the operations further include optimizing the audio signal for speech-to-text conversion during operation in the dictation mode.

In one example, the operations further include switching between the dictation mode and the telephony mode responsive to a user action received at the headset user interface. In one example, the operations further include switching between the dictation mode and the telephony mode responsive to an instruction received from a device in communication with the headset.

In one example, the operations further include switching from the dictation mode to the telephony mode responsive to answering an incoming call notification or responsive to initiation of an outgoing call. In one example, the operations further include switching from the telephony mode to the dictation mode responsive to receiving notification of activation of a speech-to-text application and switching from the dictation mode to the telephony mode responsive to receiving notification of termination of the speech-to text application.

In one example, the operations further include altering a speech processing, an audio encoding, or a wireless transmission mode of the microphone output signal when the headset is switched from the dictation mode to the telephony mode or switched from the telephony mode to the dictation mode. In one example, the operations further include outputting an earcon during the dictation mode. In one example, the operations further include reconfiguring a headset user interface responsive to switching between the telephony mode and the dictation mode.

While the exemplary embodiments of the present invention are described and illustrated herein, it will be appreciated that they are merely illustrative and that modifications can be made to these embodiments without departing from the spirit and scope of the invention. Certain examples described utilize headsets which are particularly advantageous for the reasons described herein. In further examples, other devices, such as other body worn devices may be used in place of headsets, including wrist-worn devices. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A headset comprising:
    a processor;
    a communications interface;
    a user interface;
    a speaker arranged to output audible sound to a headset wearer ear;
    a microphone arranged to detect sound and output a microphone output signal; and
    a memory storing an application executable by the processor configured to operate the headset in a first mode comprising a dictation mode utilizing a first set of signal processing parameters to process the microphone output signal and operate the headset in a second mode utilizing a second set of signal processing parameters to process the microphone output signal, wherein the first set of signal processing parameters are configured to optimize dictation speech and different from the second set of signal processing parameters.

2. The headset of claim 1, wherein the first set of signal processing parameters are configured to detect and propagate a signal component corresponding to a voice of a headset wearer for recording at the headset or a remote device.

3. The headset of claim 1, wherein the first set of signal processing parameters are configured to optimize the microphone output signal for speech-to-text conversion and the second set of signal processing parameters are configured to optimize the microphone output signal for telephony communications.

4. The headset of claim 1, wherein the microphone is part of a microphone array of two or more microphones.

5. The headset of claim 1, wherein the application is further configured to switch between the first mode and the second mode responsive to a user action received at the user interface or responsive to an instruction received from a device in communication with the headset.

6. The headset of claim 1, wherein the application is further configured to switch operation of the headset from the first mode to the second mode responsive to answering an incoming call notification or responsive to initiation of an outgoing call.

7. The headset of claim 1, wherein the application is configured to alter a speech processing, an audio encoding, or a wireless transmission mode of the microphone output signal when the headset is switched from the first mode to the second mode or switched from the second mode to the first mode.

8. The headset of claim 1, wherein the application is further configured to output an audio signal to a headset wearer at the speaker during the first mode.

9. The headset of claim 1, wherein the application is further configured to reconfigure the user interface responsive to whether the headset is operating in the first mode or the second mode.

10. A method comprising:
operating a headset having a selectable dictation mode and a selectable telephony mode in the selectable dictation mode or the selectable telephony mode, the selectable dictation mode utilizing a first set of signal processing parameters and the selectable telephony mode utilizing a second set of signal processing parameters, wherein the first set of signal processing parameters are configured to optimize dictation speech and different from the second set of signal processing parameters;
receiving sound at a headset microphone and converting the sound to an audio signal;
detecting a headset wearer voice in the audio signal and eliminating a voice call participant voice output from a headset speaker in the audio signal in the selectable telephony mode; and
detecting the headset wearer voice in the audio signal in the selectable dictation mode.

11. The method of claim 10, further comprising recording the headset wearer voice at the headset or a remote device during operation in the selectable dictation mode.

12. The method of claim 10, further comprising optimizing the audio signal for speech-to-text conversion during operation in the selectable dictation mode.

13. The method of claim 10, further comprising switching between the selectable dictation mode and the selectable telephony mode responsive to a user action received at a user interface or responsive to an instruction received from a device in communication with the headset.

14. The method of claim 10, further comprising switching from the selectable dictation mode to the selectable telephony mode responsive to answering an incoming call notification or responsive to initiation of an outgoing call.

15. The method of claim 10, further comprising switching from the selectable telephony mode to the selectable dictation mode responsive to receiving notification of activation of a speech-to-text application and switching from the selectable dictation mode to the selectable telephony mode responsive to receiving notification of termination of the speech-to text application.

16. The method of claim 10, further comprising altering a speech processing, an audio encoding, or a wireless transmission mode of the audio signal when the headset is switched from the selectable dictation mode to the selectable telephony mode or switched from the selectable telephony mode to the selectable dictation mode.

17. One or more non-transitory computer-readable storage media having computer-executable instructions stored thereon which, when executed by one or more computers, cause the one more computers to perform operations comprising:
receiving sound at a headset microphone and converting the sound to an audio signal; and
operating a headset having a dictation mode and a telephony mode in the dictation mode or the telephony mode, the dictation mode utilizing a first set of signal processing parameters and the telephony mode utilizing a second set of signal processing parameters, wherein the first set of signal processing parameters are configured to optimize dictation speech and different from the second set of signal processing parameters.

18. The one or more non-transitory computer-readable storage media of claim 17, wherein the operations further comprising recording a headset wearer voice at the headset or a remote device during operation in the dictation mode.

19. The one or more non-transitory computer-readable storage media of claim 17, wherein the operations further comprising switching between the dictation mode and the telephony mode responsive to a user action received at a headset user interface or responsive to an instruction received from a device in communication with the headset.

20. The one or more non-transitory computer-readable storage media of claim 17, wherein the operations further comprising switching from the dictation mode to the telephony mode responsive to answering an incoming call notification or responsive to initiation of an outgoing call, or switching from the telephony mode to the dictation mode responsive to receiving notification of activation of a speech-to-text application.

* * * * *